United States Patent [19]
Al-Sabah

[11] Patent Number: 5,875,997
[45] Date of Patent: Mar. 2, 1999

[54] AIRCRAFT HAVING RAISED AND REARWARD POSITIONED COCKPIT

[76] Inventor: Sabah Naser Al-Sabah, P.B. 36777, Al-Ras, 24758, Kuwait

[21] Appl. No.: 820,772

[22] Filed: Mar. 18, 1997

[51] Int. Cl.$^6$ ........................................................ B64D 11/00
[52] U.S. Cl. ........................................ 244/118.5; 244/129.3
[58] Field of Search .............................. 244/118.5, 118.6, 244/119, 129.3; D12/319, 335, 336

[56] References Cited

U.S. PATENT DOCUMENTS

| | | | |
|---|---|---|---|
| 1,283,684 | 11/1918 | Curtiss . | |
| 1,538,801 | 5/1925 | Hall | 244/76 R |
| 1,625,700 | 4/1927 | Black . | |
| 2,147,968 | 2/1939 | Delanne . | |
| 2,240,747 | 5/1941 | Babb et al. . | |
| 2,441,913 | 5/1948 | Taylor | 244/118.1 |
| 2,694,537 | 11/1954 | Reichert | 244/118.5 |
| 4,055,317 | 10/1977 | Greiss | 244/118.5 |
| 5,115,999 | 5/1992 | Buchsel et al. | 244/118.5 |
| 5,275,360 | 1/1994 | Porter et al. . | |
| 5,526,999 | 6/1996 | Meston | 244/118.5 X |

FOREIGN PATENT DOCUMENTS

| | | | |
|---|---|---|---|
| 471946 | 9/1937 | France | 244/13 |
| 470650 | 9/1937 | United Kingdom . | |

OTHER PUBLICATIONS

Flight Magazine, Nov. 26, 1942, p. 540.

Primary Examiner—Charles T. Jordan
Assistant Examiner—Charles R. Ducker, Jr.
Attorney, Agent, or Firm—Allen, Dyer, Doppelt, Milbrath & Gilchrist, P.A.

[57] ABSTRACT

An aircraft for transporting passengers is provided having a raised and rearward positioned cockpit. The aircraft preferably has an elongate main body including a passenger compartment positioned in a forward end of the main body and a passenger window extending across the forward end of the main body for forward viewing by passengers positioned in the passenger compartment. The passenger window preferably extends substantially the entire height of the passenger compartment of the main body, the entire lateral extent of the forward end of the passenger compartment of the main body, and into forward side peripheries of the passenger compartment of the main body to thereby define a panoramic-type viewing window for passengers positioned in the forward end portion of the main body. A plurality of wings are connected to and extend outwardly from the main body. A tail is connected to a rearward end of the main body. A crew cockpit is connected to and positioned to overlie a rearward portion of the main body adjacent the tail and extending upwardly from the main body at a higher elevation than the passenger compartment so as to define a raised crew cockpit for improving overall vision of the operating crew during operation of the aircraft.

46 Claims, 10 Drawing Sheets

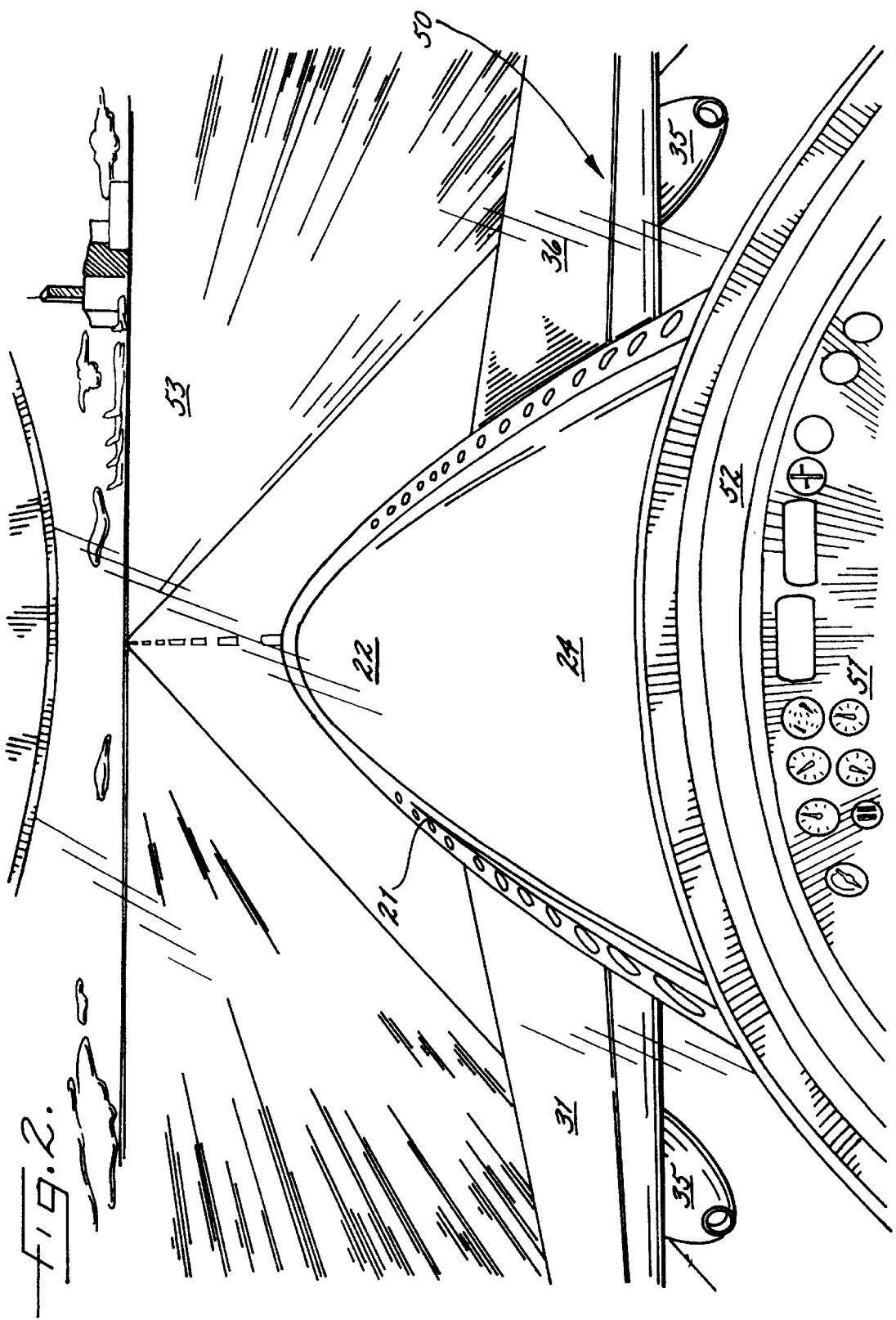

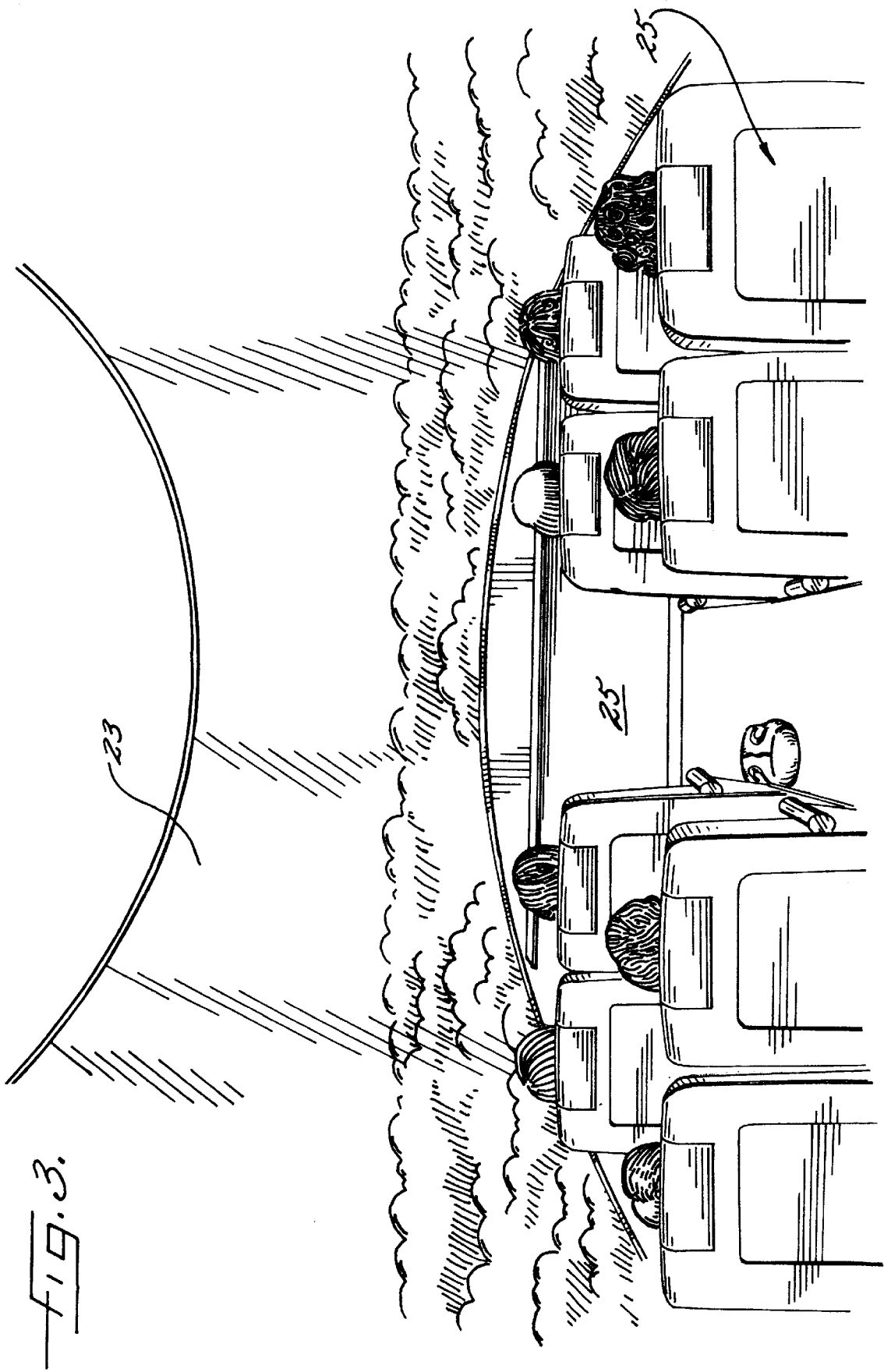

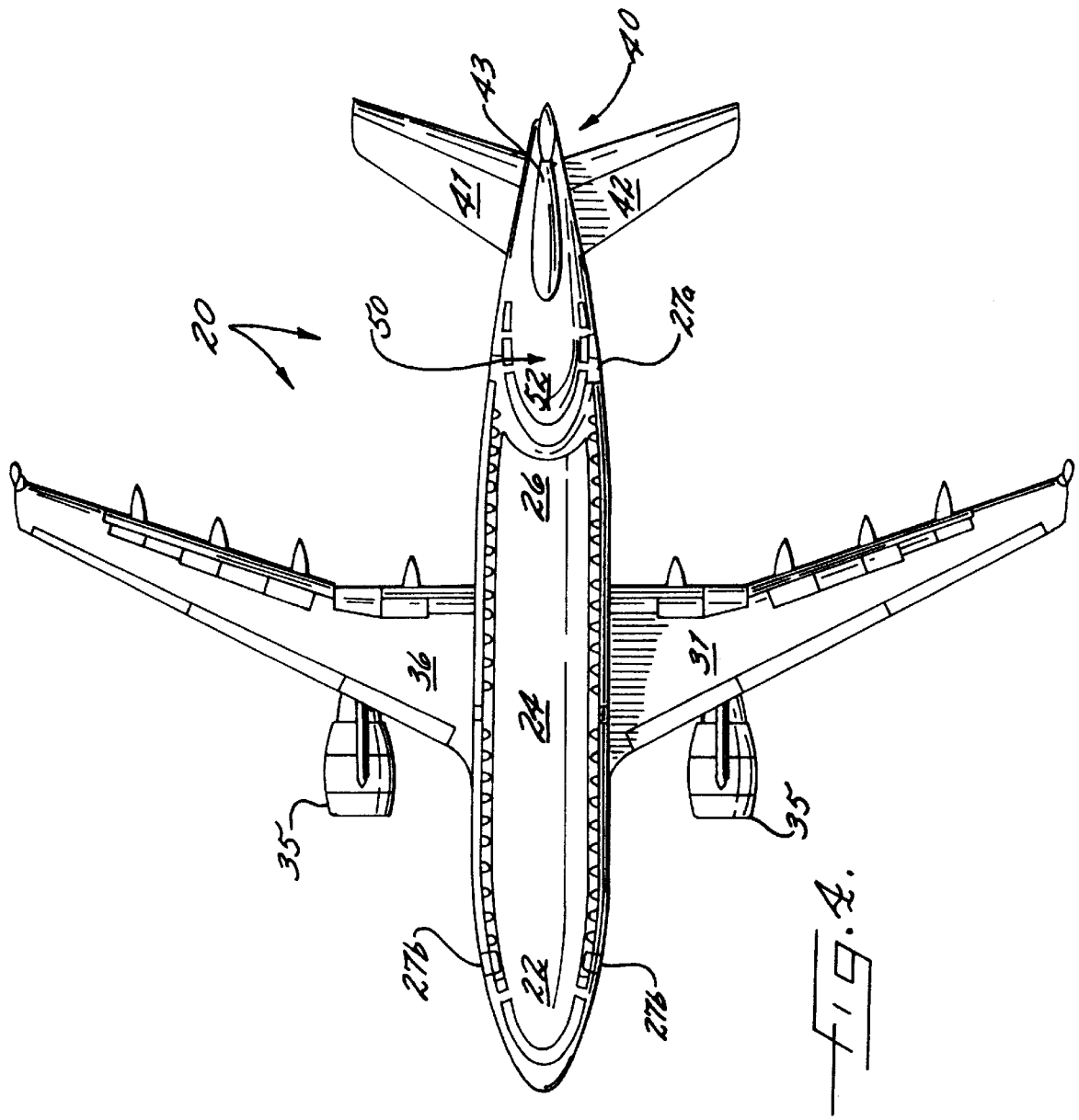

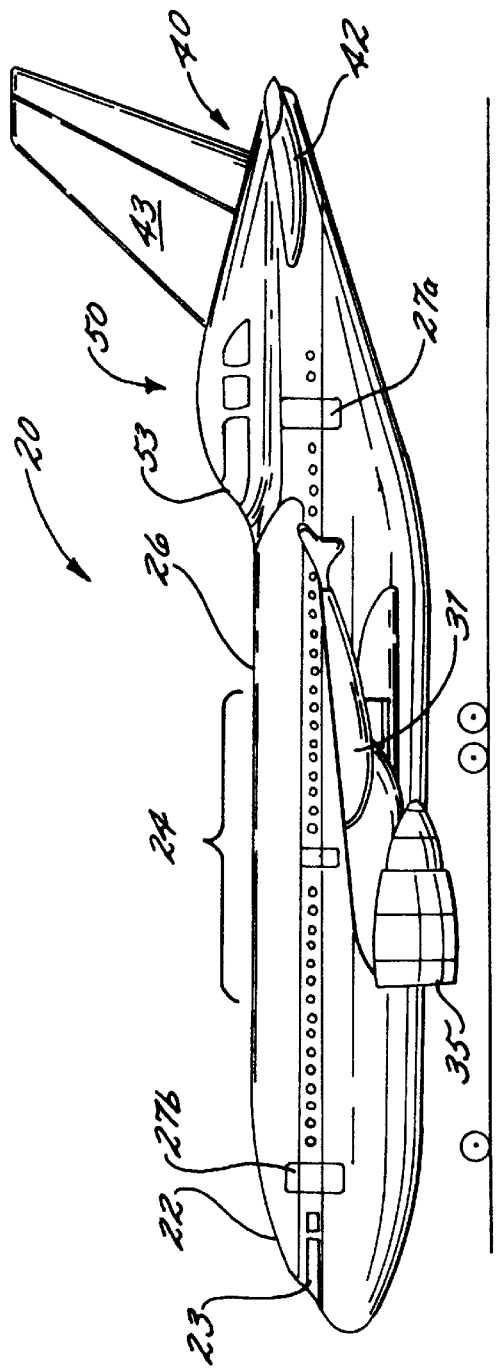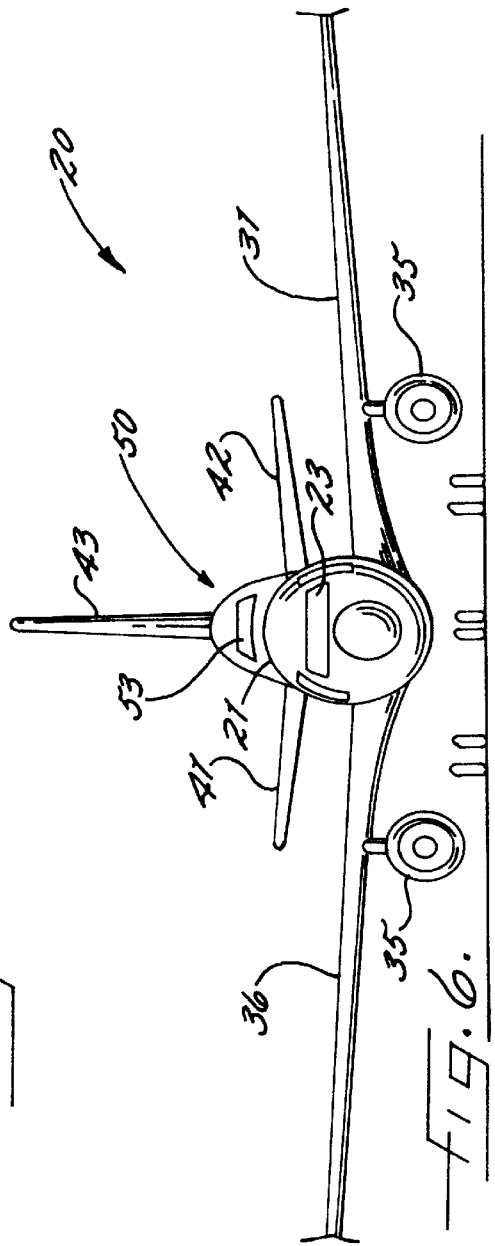

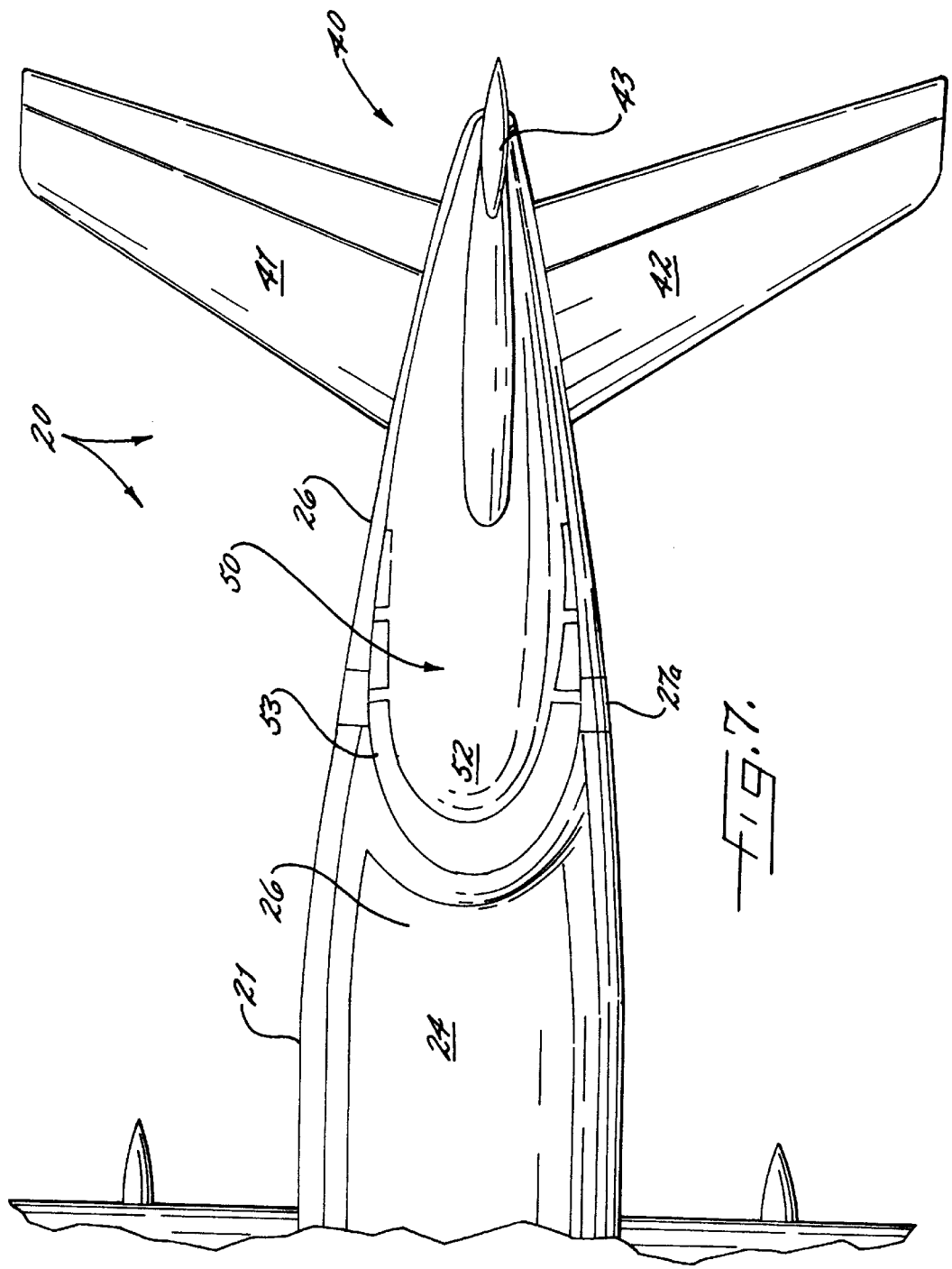

AIRCRAFT HAVING RAISED AND REARWARD POSITIONED COCKPIT

FIELD OF THE INVENTION

The present invention relates to the field of aviation and, more particularly, to aircraft for carrying passengers therein.

BACKGROUND OF THE INVENTION

The aviation industry has developed over the years into what is now various sophisticated commercial, military, and private aircraft. Although aircraft in the aviation industry started as crude attempts to fly or crude attempts at a particular type of flying stunt or feat, the aviation industry now includes sophisticated flight simulation, design, testing, and engineering facilities for development of these aircraft.

Some aircraft have been developed over the years which positioned the crew cockpit or operating controls for the pilot, co-pilot, and others in a rearward portion of the main body or fuselage of an aircraft. Examples of such rearward positioned cockpits can be seen in U.S. Pat. No. 5,526,999 by Meston titled "Spacecraft With A Crew Escape System", U.S. Pat. No. 1,625,700 by Black titled "Freight Airplane Body", United Kingdom Published Patent Application No. 470,650 by Tiltman titled "Improvements In Or Relating To Aircraft", and Italy Published Patent Application No. 627, 727. Because of the specific problems in military and freight transporting applications, these rearward positioned cockpits for aircraft, however, have been targeted primarily for military and freight aircraft only and have not been considered extensively for commercial passenger aircraft.

Also, over the years, attempts to increase passenger space for commercial-passenger type aircraft have conventionally focused only on raising the height of the main body of the aircraft, e.g., a larger circumference, or widening the main body of the aircraft. Although these attempts have provided some comfort and advantages to passengers, especially commercial passengers, these changes can be expensive and still maintain the crew cockpit in the conventional forward or distal end of the main body of the aircraft.

Additionally, unlike windows and windshields on a car, a continual problem exists with passengers not being able to enjoy a full view of where they are travelling. Current viewing is limited to small windows positioned along the side portions of the main body of an aircraft. The current limited viewing, for example, requires passengers and commercial airlines to focus time and money on entertaining or occupying passengers during flight.

SUMMARY OF THE INVENTION

With the foregoing in mind, the present invention advantageously provides an aircraft and methods for improving passenger viewing and increasing travel enjoyment by passengers during travel in an aircraft. The aircraft advantageously positions the crew cockpit in a rearward portion of the aircraft and raises the cockpit above the level of the passenger compartment. This arrangement advantageously allows the forward or distal end of the main body of the aircraft to be fitted for a panoramic-type window for passengers positioned in the forward portion, e.g., first-class or business-class commercial passengers, of the main body.

The aircraft also advantageously provides a structure and design of the main body and the raised crew cockpit which are aerodynamic and improve fuel and speed efficiencies. This structure and design are attractive and do not require extensive airport terminal redesigns to accommodate such aircraft.

More specifically, the present invention provides an aircraft for transporting passengers which has a raised and rearward positioned crew cockpit. The aircraft preferably has an elongate main body which includes a passenger compartment positioned in a forward end of the main body and a passenger window extending across the forward end of the main body for forward viewing by passengers positioned in the passenger compartment. The passenger window preferably extends substantially the entire height of the passenger compartment of the main body, the entire lateral extent of the forward end of the passenger compartment of the main body, and into forward side peripheries of the passenger compartment of the main body to thereby define a panoramic-type viewing window for passengers positioned in the forward end portion of the main body. A plurality of wings are connected to and extend outwardly from the main body. A tail is connected to a rearward end of the main body. A crew cockpit is connected to and positioned to overlie a rearward portion of the main body adjacent the tail and extends upwardly from the main body at a higher elevation than the passenger compartment thereof so as to define a raised crew cockpit for improving overall vision of the operating crew during operation of the aircraft.

By use of an aircraft having a raised and rearward position cockpit according to the present invention, the captain and crew of the aircraft, for example, can advantageously view the entire aircraft, except for the rearward end or the tail. Such a view advantageously enables the captain and crew to improve control of the take-off, landing, and in-flight processes. It also provides the operating crew a constant visual monitor of the wings and engines (i.e., mounted to the wings) so that proper function or problems can be visually observed. This positioning of the cockpit also advantageously increases the size or space in the aircraft for first class or other passengers positioned within the passenger compartment of the aircraft. It also advantageously allows improved security for the operating crew by providing a separate entrance and exit than the entrance and exit of the passengers.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 2 is a perspective environmental view of an aircraft having a raised and rearward positioned cockpit as viewed from the crew cockpit of the aircraft according to an embodiment of the present invention;

FIG. 3 is a perspective environmental view of an aircraft having a raised and rearward positioned cockpit as viewed from the passenger compartment according to an embodiment of the present invention;

FIG. 4 is a top plan view of an aircraft having a raised and rearward positioned cockpit according to an embodiment of the present invention;

FIG. 5 is a side elevational view of an aircraft having a raised and rearward positioned cockpit according to an embodiment of the present invention;

FIG. 6 is a front elevational view of an aircraft having a raised and rearward positioned cockpit according to an embodiment of the present invention;

FIG. 7 is a fragmentary top plan view of a rearward portion of an aircraft having a raised and rearward positioned cockpit according to an embodiment of the present invention;

DETAILED DESCRIPTION

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation are used to indicate similar elements in alternative embodiments.

Figure 1:
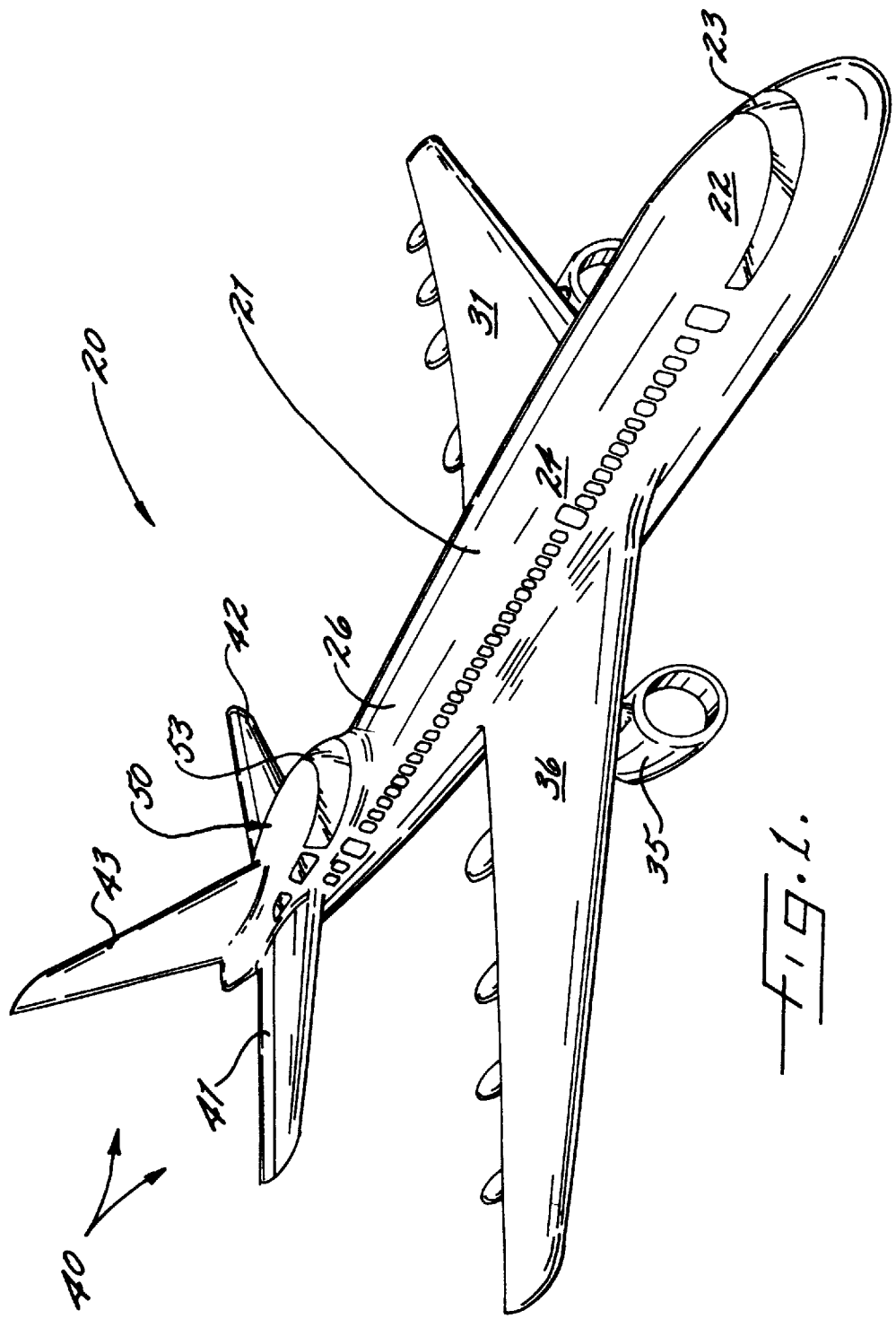
FIG. 1 is a perspective view of an aircraft having a raised and rearward positioned cockpit according to an embodiment of the present invention.

FIG. 1 illustrates a perspective view of an aircraft 20 for transporting passengers according to an embodiment of the present invention. The aircraft 20 preferably and advantageously is illustrated as a commercial aircraft for carrying commercial passengers which can increase there enjoyment of air travel by use of an aircraft 20 according to the present invention. The aircraft 20 preferably is aerodynamically designed for fuel and speed efficiencies.

As best illustrated in FIGS. 1 and 4–6, the aircraft 20 preferably has an elongate main body 21 which includes a passenger compartment 25 positioned in a forward end 22 of the main body 21. A passenger window 23 extends across the forward end 22 of the main body 21 for forward viewing by passengers positioned in the passenger compartment 25. The aircraft 20 also has a plurality of wings 31, 36, e.g., a pair, connected to and extending outwardly from a medial portion 24 of the main body 21 and a tail 40 having a plurality of tail fins 41, 42, 43 connected to and extending outwardly from a rearward end portion 26, e.g., aft, of the main body 21. A crew cockpit 50 is connected to and positioned to overlie a rearward portion 26 of the main body 21 adjacent the tail 40. The crew cockpit 50 extends upwardly from the main body 21 at a higher elevation than the passenger compartment 25 so as to define a raised crew cockpit 50 for improving overall vision of the operating crew during operation of the aircraft 20.

As best illustrated in FIGS. 3 and 6, the passenger window 23 of the main body 21 preferably extends substantially the entire height of the passenger compartment 25 of the main body 21, the entire lateral extent of the forward end of the passenger compartment 25 of the main body 21, and into forward side peripheries of the passenger compartment 25 of the main body 21 to thereby define a panoramic-type viewing passenger window 23 for passengers positioned in the forward end portion 22 of the main body 21. This panoramic-type viewing passenger window 23 advantageously allows passengers to view good aspects of the flight, such as mountains, clouds, water, cities, sunsets, and stars, and bad aspects of the flight, such as various bad weather conditions, mountains, and problems with landings. It also allows commercial airlines to charge a higher airfare or compete more competitively for seats with better or improved views.

Figure 10:
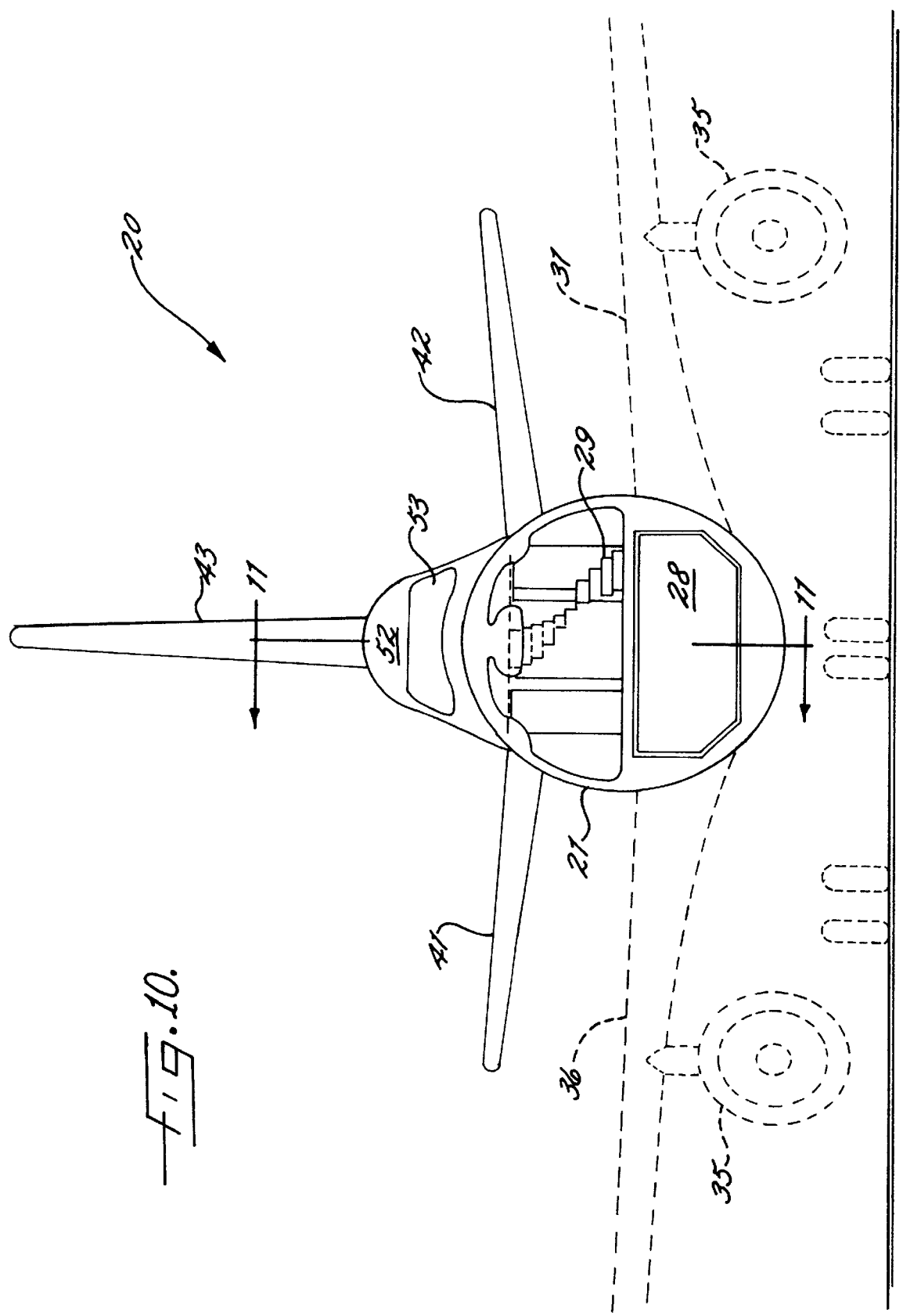
FIG. 10 is a transverse sectional view of a rearward portion of an aircraft having a raised and rearward positioned cockpit taken along line 10—10 of FIG. 9 according to an embodiment of the present invention.

The positioning of the raised crew cockpit 50, for example, advantageously increases the size or space in the aircraft 20 for first class or other passengers positioned within the passenger compartment 25 of the aircraft 20. The passenger compartment 25 of the main body 25 therefore generally has a larger passenger seating capacity than an aircraft having a main body with about the same outside perimeter and a forward-end positioned crew cockpit. The main body 21 also has a passenger luggage compartment 28 positioned so as to underlie at least portions of the passenger compartment 25 at a lower elevation than the passenger compartment 25 (see FIGS. 10–11).

As illustrated in FIG. 4–5, 8–9, and 11, the main body 21 of the aircraft 20 preferably further includes an aircraft crew entrance and exit door 27a positioned in a rearward end portion of the main body 21 and adjacent the raised crew cockpit 50 for entrance and exit by the aircraft crew from the main body 21. At least one passenger entrance and exit door 27b is positioned in a forward portion of the main body 21 for entrance and exit by passengers to thereby separate the crew entrance and exit from passenger entrance and exit. A plurality of stairs 29 e.g., cockpit accessing means, extend between a lower elevation corresponding to the elevation of the passenger compartment 25 and an upper elevation corresponding to the raised crew cockpit 50 for providing access to and from the raised crew cockpit at the higher elevation. The crew entrance and exit door 27a preferably is positioned at the same elevation as the at least one passenger entrance and exit door 27b. By advantageously providing a separate entrance and exit than the entrance and exit of the passengers, access to and the general security of the aircraft operating crew can be improved.

Figure 8:
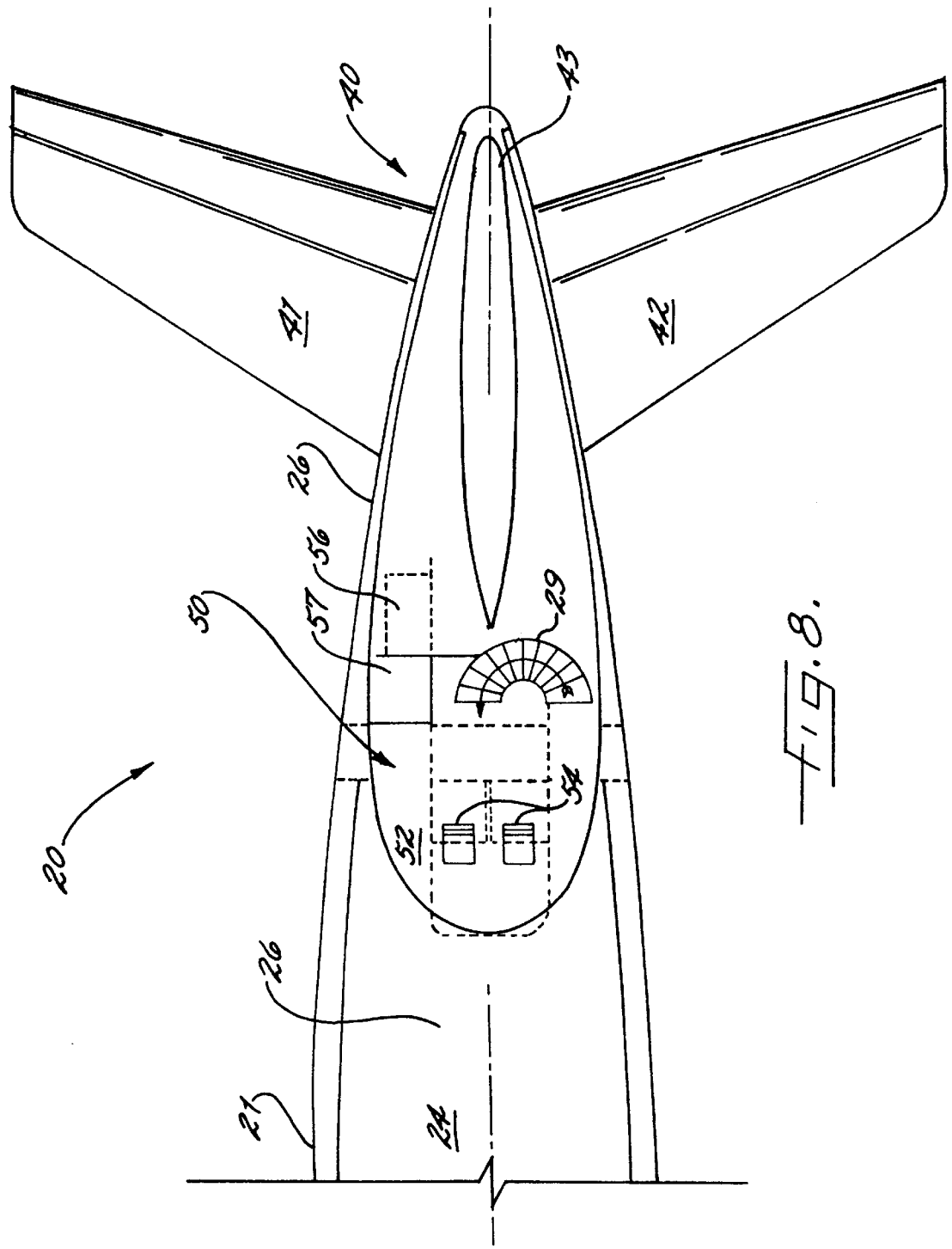
FIG. 8 is a transverse sectional view of a rearward portion of an aircraft having a raised and rearward positioned cockpit taken along line 8—8 of FIG. 7 according to an embodiment of the present invention.
Figure 11:
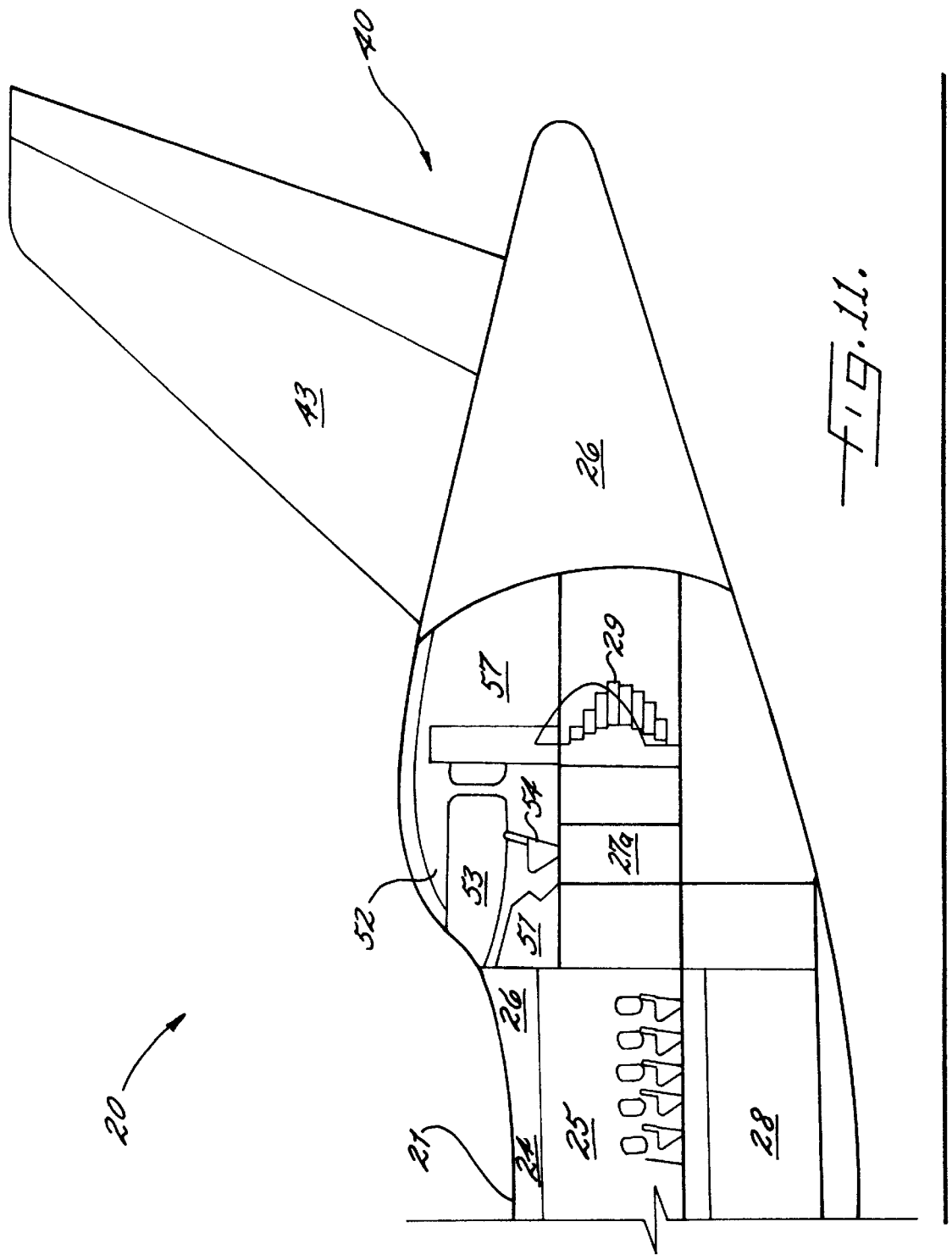
FIG. 11 is a vertical sectional view of a rearward portion of an aircraft having a raised and rearward positioned cockpit taken along line 11—11 of FIG. 10 according to an embodiment of the present invention.

As illustrated in FIGS. 8 and 11, the aircraft 20 preferably has additional crew usage space positioned adjacent and at the same level as the raised crew cockpit 50. This additional crew space preferably has a separate lavatory facility 56, e.g., bathroom or washroom, and a separate kitchen 57 for the aircraft crew at an upper or higher elevation than those used by the passengers, e.g., a lower elevation. As understood by those skilled in the art, the crew lavatory 56 and the crew kitchen 57 can include various appliances, storage, sanitary services, and plumbing as needed or desired for conventional aircraft. This separate crew lavatory 56 and this separate crew kitchen 57 advantageously provide additional privacy, cleanliness, and security to the aircraft crew instead of commingling these facilities with the passengers. The crew lavatory 56 and kitchen 57 also provide additional back-up capacity for the aircraft 20 should services from these additional facilities be needed.

As best illustrated in FIGS. 2, 4–9, and 11, the raised crew cockpit 50 preferably includes aircraft operating controls 51 for controlling the aircraft, e.g., take-off, landing, flight, and various other operations and a cockpit window 53 positioned in a forward end 52 of the raised crew cockpit 50. As understood by these skilled in the art, seats 54 and various other instrumentation are included in the cockpit 50. The cockpit window 53 also extends the entire lateral extent of the forward end 52 of the raised crew cockpit 50 and into forward side peripheries of the raised crew cockpit 50 for improving visibility of the portion of the aircraft 20 extending forwardly of the raised crew cockpit 50 (see FIG. 2).

Forward end portions of the passenger window 23 and the cockpit window 53 preferably extend in generally-parallel horizontal planes and each respectively have a generally C-shape extending from a side periphery, across the forward end, and into an opposing side periphery (see FIG. 4). This configuration not only adds to the attractiveness of the design, but also adds to the aerodynamics of the design and structure by providing similarly situated smooth and inclined surfaces for the windows 23, 53 and the forward end portions 22 of the aircraft 20 itself and the raised crew cockpit 50.

The captain and crew of the aircraft 20, for example, can advantageously view the entire aircraft 20, except for the rearward end or the tail 40. Such a view, as illustrated in FIG. 2, advantageously enables the captain and crew to improve control of the take-off, landing, and in-flight processes. It also provides the operating crew a constant visual monitor of the wings 31, 36 and engines 35 (e.g., mounted to the wings 31, 36) so that proper function or problems associated with the wings 31, 36 and engines 35 can be visually observed.

Figure 9:
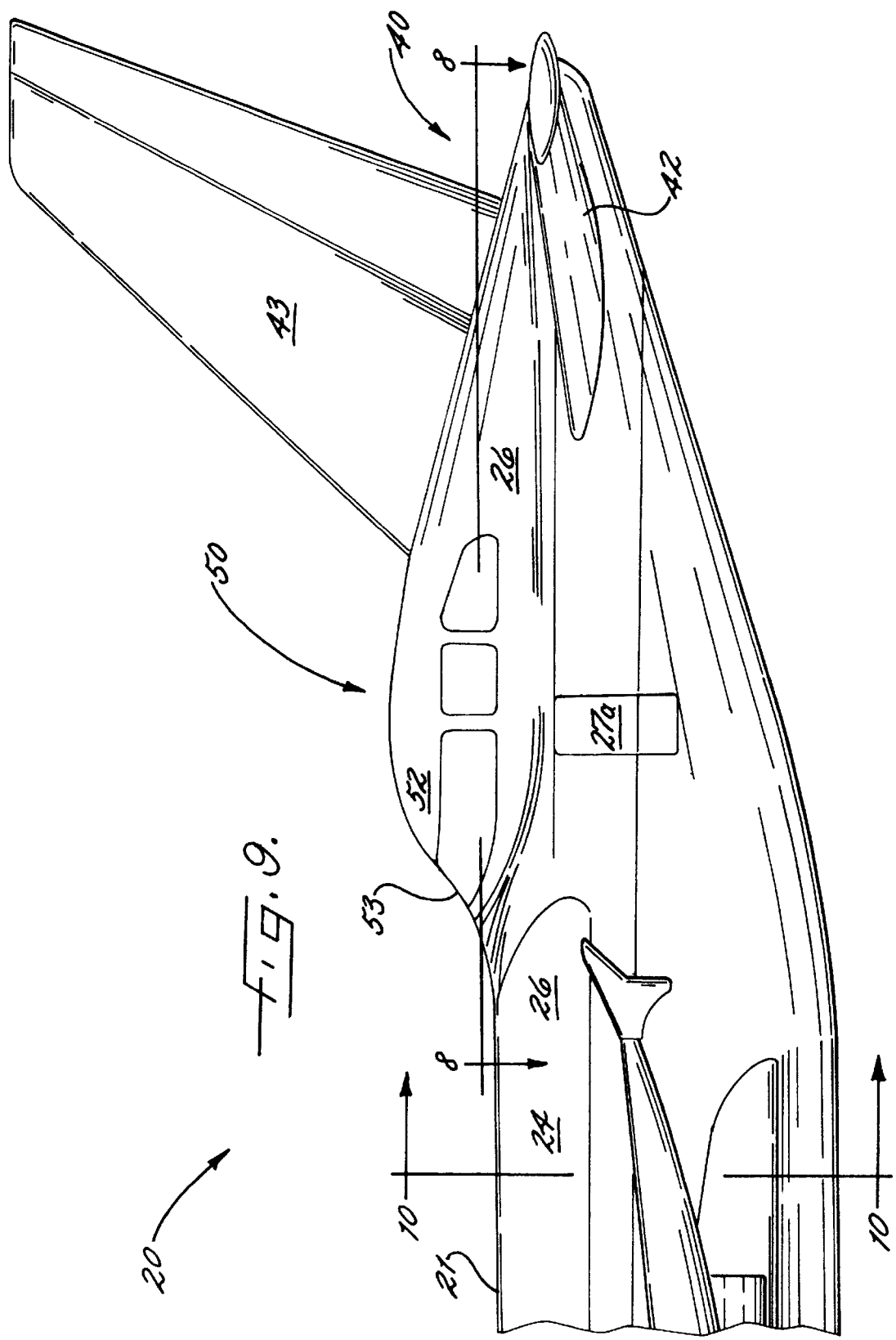
FIG. 9 is a fragmentary side elevational view of a rearward portion of an aircraft having a raised and rearward positioned cockpit according to an embodiment of the present invention.

As best illustrated in the fragmentary side elevational view of FIG. 9, the upper outer surface of the elongate main body 21 of the aircraft 20 according to the present invention preferably extends in a first generally horizontal plane, and the upper outer surface of the raised crew cockpit 50 extends upwardly at an incline from a rearward end of the elongate main body 21 in a second plane generally transverse to the first plane and at an angle less than about 20 degrees, e.g., about 10 degrees (see also FIG. 5). The upper outer surface of the raised crew cockpit 50 further accurately extends upwardly at an incline from a rearward medial portion of the elongate main body 21 at an angle in the range of about 10–40 degrees, e.g., about 25–30 degrees, so as to form a smoothly curved forward end portion of the raised crew cockpit 50 connecting to the inclined upper outer surface of the raised crew cockpit 50 which extends upwardly from the rearward end of the elongate main body.

The aircraft 20 having the raised and rearward positioned cockpit 50 of the present invention advantageously provides a structure and design of the main body 21 and the raised crew cockpit 50 which are aerodynamic and improve fuel and speed efficiencies. This structure and design are attractive and do not require extensive airport terminal redesigns to accommodate such aircraft 20. The separate crew entrance and exit, for example, can be accommodated by conventional transportable stairs as understood by those skilled in the art and by conventional terminal which allow for exiting of passenger through forward and rearward entrance and exit doors.

As best illustrated in FIGS. 4–6 and 10, the elongate main body 21 of the aircraft 20 preferably has a generally cylindrical shape. The opposing side peripheries of the raised crew cockpit 50 extends upwardly at an angle in the range of about 50–80 degrees, e.g., about 65–70 degrees, from respective opposing side peripheries of the cylindrically-shaped, elongate main body 21. A front elevational view of the combination of the main body 21 and the raised crew cockpit 50 has a generally pear shape.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. An aircraft for transporting passengers, the aircraft comprising:

an elongate main body including an outer surface, a passenger compartment positioned in a forward end of said main body, and a passenger window extending laterally across the forward end of said main body for forward viewing by passengers positioned in said passenger compartment, the upper outer surface of said elongate main body extends in a first generally horizontal plane;

a plurality of wings connected to and extending outwardly from said main body;

a tail connected to a rearward end portion of said main body; and a crew cockpit connected to and positioned to overlie a rearward portion of said main body adjacent said tail and extending upwardly from said main body at a higher elevation than the passenger compartment so as to define a raised crew cockpit for improving overall vision of the operating crew during operation of the aircraft, the upper outer surface of said raised crew cockpit extending upwardly at an incline from a rearward end of said elongate main body in a second plane generally transverse to the first plane of said main body and at an angle less than about 20 degrees.

2. An aircraft as defined in claim 1, wherein said passenger window extends substantially the entire height of the passenger compartment of said main body, the entire lateral extent of the forward end of the passenger compartment of said main body, and into forward side peripheries of the passenger compartment of said main body to thereby define a panoramic-type viewing passenger window for passengers positioned in the forward end portion of the main body.

3. An aircraft as defined in claim 1, wherein said raised crew cockpit includes a cockpit window positioned in a forward end-of said raised crew cockpit and extending the entire lateral extent of the forward end of said raised crew cockpit and into forward side peripheries of said raised crew cockpit for improving visibility of the portion of the aircraft extending forwardly of said raised crew cockpit.

4. An aircraft as defined in claim 3, wherein forward end portions of said passenger window and said cockpit window extend in generally-parallel horizontal planes.

5. An aircraft as defined in claim 3, wherein each of said passenger and cockpit windows respectively have a generally C-shape extending from a side periphery, across the forward end, and into an opposing side periphery.

6. An aircraft as defined in claim 1, wherein said main body further includes an aircraft crew entrance and exit door positioned in a rearward portion of said main body and adjacent said raised crew cockpit for entrance and exit by the aircraft crew from said main body and at least one passenger entrance and exit door positioned in a forward portion of said main body for entrance and exit by passengers to thereby separate the crew entrance and exit from passenger entrance and exit.

7. An aircraft as defined in claim 6, wherein said main body further includes a plurality of stairs extending between a lower elevation corresponding to the elevation of the passenger compartment and an upper elevation corresponding to said raised crew cockpit, and wherein said crew entrance and exit door is positioned at the same elevation as said at least one passenger entrance and exit door.

8. An aircraft as defined in claim 7, further comprising a raised crew lavatory and a raised crew kitchen each respectively positioned at the upper elevation adjacent said raised crew cockpit for providing separate crew lavatory and kitchen facilities.

9. An aircraft as defined in claim 8, wherein said main body further includes a passenger luggage compartment positioned so as to underlie at least portions of the passenger compartment at a lower elevation than said passenger compartment.

10. An aircraft as defined in claim 1, wherein said passenger compartment has a larger passenger seating capacity than an aircraft having a main body with about the same outside perimeter and a forward-end positioned crew cockpit.

11. An aircraft as defined in claim 1, wherein the upper outer surface of said raised crew cockpit further accurately extends upwardly at an incline from a rearward medial portion of said elongate main body at an angle in the range of about 10–40 degrees so as to form a smoothly curved forward end portion of said raised crew cockpit connected to the inclined upper outer surface of said raised crew cockpit extending upwardly the rearward end of said elongate main body.

12. An aircraft as defined in claim 1, wherein said elongate main body has a generally cylindrical shape, wherein opposing side peripheries of said raised crew cockpit extends upwardly at an angle in the range of about 50–80 degrees from respective opposing side peripheries of said cylindrically-shaped, elongate main body, and wherein a front elevational view of the combination of said main body and said raised crew cockpit has a generally pear shape.

13. An aircraft for transporting passengers, the aircraft comprising:
an elongate main body including an outer surface, a passenger compartment positioned in a forward end of said main body, and a passenger window extending laterally across the forward end of said main body, said passenger window extending substantially the entire height of the passenger compartment of said main body, the entire lateral extent of the forward end of the passenger compartment of said main body, and into forward side peripheries of the passenger compartment of said main body to thereby define a panoramic-type viewing passenger window for passengers positioned in the forward end portion of the main body;
a plurality of wings connected to and extending outwardly from said main body;
a tail connected to a rearward end portion of said main body; and
a crew cockpit which includes aircraft operating controls connected to and positioned to have major portions at a higher elevation than the outer surface of a rearward portion of said main body adjacent said tail and extending upwardly from said main body at a higher elevation than the passenger compartment so as to define a raised crew cockpit for improving overall vision of the operating crew during operation of the aircraft, said raised crew cockpit including a non-transparent roof and at least one transparent cockpit window positioned in a forward end of said raised crew cockpit and extending the entire lateral extent of the forward end of said raised crew cockpit and into forward side peripheries of said raised crew cockpit for improving visibility of the portion of the aircraft extending forwardly of said raised crew cockpit.

14. An aircraft as defined in claim 13, wherein forward end portions of said passenger window and said cockpit window extend in generally-parallel horizontal planes.

15. An aircraft as defined in claim 14, wherein each of said passenger and cockpit windows respectively have a generally C-shape extending from a side periphery, across the forward end, and into an opposing side periphery.

16. An aircraft as defined in claim 15, wherein said main body further includes an aircraft crew entrance and exit door positioned in a rearward portion of said main body and adjacent said raised crew cockpit for entrance and exit by the aircraft crew from said main body and at least one passenger entrance and exit door positioned in a forward portion of said main body for entrance and exit by passenger to thereby separate the crew entrance and exit from passenger entrance and exit.

17. An aircraft as defined in claim 16, wherein said main body further includes a plurality of stairs extending between a lower elevation corresponding to the elevation of the passenger compartment and an upper elevation corresponding to said raised crew cockpit, and wherein said crew entrance and exit door is positioned at the same elevation as said at least one passenger entrance and exit door.

18. An aircraft as defined in claim 16, further comprising a raised crew lavatory and a raised crew kitchen each respectively positioned at the upper elevation adjacent said raised crew cockpit for providing separate crew lavatory and kitchen facilities.

19. An aircraft as defined in claim 18, wherein said main body further includes a passenger luggage compartment positioned so as to underlie at least portions of the passenger compartment at a lower elevation than said passenger compartment.

20. An aircraft as defined in claim 19, wherein said passenger compartment has a larger passenger seating capacity than an aircraft having a main body with about the same outside perimeter and a forward-end positioned crew cockpit.

21. An aircraft as defined in claim, 20, wherein the upper outer surface of said elongate main body extends in a first generally horizontal plane, and wherein the upper outer surface of said raised crew cockpit extends upwardly at an incline from a rearward end of said elongate main body in a second plane generally transverse to the first plane and at an angle less than about 20 degrees.

22. An aircraft as defined in claim 21, wherein the upper outer surface of said raised crew cockpit further arcuately extends upwardly at an incline from a rearward medial portion of said elongate main body at an angle in the range of about 10–40 degrees so as to form a smoothly curved forward end portion of said raised crew cockpit connected to the inclined upper outer surface of said raised crew cockpit extending upwardly from the rearward end of said elongate main body.

23. An aircraft as defined in claim 22, wherein said elongate main body has a generally cylindrical shape, wherein opposing side peripheries of said raised crew cockpit extends upwardly at an angle in the range of about 50–80 degrees from respective opposing side peripheries of said cylindrically-shaped, elongate main body, and wherein a front elevational view of the combination of said main body and said raised crew cockpit has a generally pear shape.

24. An aircraft for transporting passengers, the aircraft comprising:
an elongate main body including an outer surface, a passenger compartment positioned in a forward end of said main body, a passenger window extending across the forward end of said main body for forward viewing by passengers positioned in said passenger compartment, and a passenger luggage compartment positioned so as to underlie at least portions of the passenger compartment at a lower elevation than said passenger compartment;

a plurality of wings connected to and extending outwardly from said main body;

a tail connected to a rearward end portion of said main body and having a plurality of tail fins; and a crew cockpit which includes aircraft operating controls connected to and positioned to have major portions at a higher elevation than the outer surface of a rearward portion of said main body adjacent said tail and extending upwardly from said main body at a higher elevation than the passenger compartment so as to define a raised crew cockpit for improving overall vision of the operating crew during operation of the aircraft, an outer surface of medial rearward portions of said raised crew cockpit extending into at least one upwardly extending tail fin of the plurality of tail fins of said tail.

25. An aircraft as defined in claim 24, wherein said main body further includes an aircraft crew entrance and exit door positioned in a rearward portion of said main body and adjacent said raised crew cockpit for entrance and exit by the aircraft crew from said main body and at least one passenger entrance and exit door positioned in a forward portion of said main body for entrance and exit by passenger to thereby separate the crew entrance and exit from passenger entrance and exit.

26. An aircraft as defined in claim 25, wherein said main body further includes a plurality of stairs extending between a lower elevation corresponding to the elevation of the passenger compartment and an upper elevation corresponding to said raised crew cockpit, and wherein said crew entrance and exit door is positioned at the same elevation as said at least one passenger entrance and exit door.

27. An aircraft as defined in claim 26, further comprising a raised crew lavatory and a raised crew kitchen each respectively positioned at the upper elevation adjacent said raised crew cockpit for providing separate crew lavatory and kitchen facilities.

28. An aircraft as defined in claim 27, wherein said passenger compartment has a larger passenger seating capacity than an aircraft having a main body with about the same outside perimeter and a forward-end positioned crew cockpit.

29. An aircraft as defined in claim 28, wherein the upper outer surface of said elongate main body extends in a first generally horizontal plane, and wherein the upper outer surface of said raised crew cockpit extends upwardly at an incline from a rearward end of said elongate main body in a second plane generally transverse to the first plane and at an angle less than about 20 degrees.

30. An aircraft as defined in claim 29, wherein the upper outer surface of said raised crew cockpit further arcuately extends upwardly at an incline from a rearward medial portion of said elongate main body at an angle in the range of about 10–40 degrees so as to form a smoothly curved forward end portion of said raised crew cockpit connected to the inclined upper outer surface of said raised crew cockpit extending upwardly from the rearward end of said elongate main body.

31. An aircraft as defined in claim 30, wherein said elongate main body has a generally cylindrical shape, wherein opposing side peripheries of said raised crew cockpit extends upwardly at an angle in the range of about 50–80 degrees from respective opposing side peripheries of said cylindrically-shaped, elongate main body, and wherein a front elevational view of the combination of said main body and said raised crew cockpit has a generally pear shape.

32. An aircraft as defined in claim 31, wherein said passenger window extends substantially the entire height of the passenger compartment of said main body, the entire lateral extent of the forward end of the passenger compartment of said main body, and into forward side peripheries of the passenger compartment of said main body to thereby define a panoramic-type viewing passenger window for passengers positioned in the forward end portion of the main body.

33. An aircraft as defined in claim 32, wherein said raised crew cockpit includes a cockpit window positioned in a forward end of said raised crew cockpit and extending the entire lateral extent of the forward end of said raised crew cockpit and into forward side peripheries of said raised crew cockpit for improving visibility of the portion of the aircraft extending forwardly of said raised crew cockpit.

34. An aircraft as defined in claim 33, wherein forward end portions of said passenger window and said cockpit window extend in generally-parallel horizontal planes.

35. An aircraft as defined in claim 34, wherein each of said passenger and cockpit windows respectively have a generally C-shape extending from a side periphery, across the forward end, and into an opposing side periphery.

36. An aircraft for transporting passengers, the aircraft comprising:

an elongate main body having an upper outer surface thereof extending in a first generally horizontal plane and a passenger compartment positioned in a forward end of said main body;

a plurality of wings connected to and extending outwardly from said main body;

a tail connected to a rearward end portion of said main body; and a crew cockpit which includes aircraft operating controls connected to and positioned to have major portions at a higher elevation than the outer surface of a rearward portion of said main body adjacent said tail and extending upwardly from said main body at a higher elevation than the passenger compartment so as to define a raised crew cockpit for improving overall vision of the operating crew during operation of the aircraft, said raised crew cockpit having an upper outer surface thereof extending upwardly at an incline from a rearward end of said elongate main body in a second plane generally transverse to the first plane and at an angle less than about 20 degrees and arcuately extending upwardly at an incline from a rearward medial portion of said elongate main body at an angle in the range of about 10–40 degrees so as to form a smoothly curved forward end portion of said raised crew cockpit connected to the inclined upper outer surface of said raised crew cockpit extending upwardly from the rearward end of said elongate main body.

37. An aircraft as defined in claim 36, wherein said elongate main body has a generally cylindrical shape, wherein opposing side peripheries of said raised crew cockpit extends upwardly at an angle in the range of about 50–80 degrees from respective opposing side peripheries of said cylindrically-shaped, elongate main body, and wherein a front elevational view of the combination of said main body and said raised crew cockpit has a generally pear shape.

38. An aircraft as defined in claim 37, wherein said passenger compartment has a larger passenger seating capacity than an aircraft having a main body with about the same outside perimeter and a forward-end positioned crew cockpit.

39. An aircraft as defined in claim 38, wherein said main body further includes an aircraft crew entrance and exit door positioned in a rearward portion of said main body and adjacent said raised crew cockpit for entrance and exit by the aircraft crew from said main body and at least one passenger entrance and exit door positioned in a forward portion of said main body for entrance and exit by passenger to thereby separate the crew entrance and exit from passenger entrance and exit.

40. An aircraft as defined in claim 39, wherein said main body further includes a plurality of stairs extending between a lower elevation corresponding to the elevation of the passenger compartment and an upper elevation corresponding to said raised crew cockpit, and wherein said crew entrance and exit door is positioned at the same elevation as said at least one passenger entrance and exit door.

41. An aircraft as defined in claim 40, further comprising a raised crew lavatory and a raised crew kitchen each respectively positioned at the upper elevation adjacent said raised crew cockpit for providing separate crew lavatory and kitchen facilities.

42. An aircraft as defined in claim 41, wherein said main body further includes a passenger luggage compartment positioned so as to underlie at least portions of the passenger compartment at a lower elevation than said passenger compartment.

43. An aircraft as defined in claim 42, wherein said main body further includes a passenger window positioned in a forward end of said main body and extending substantially the entire height of the passenger compartment of said main body, the entire lateral extent of the forward end of the passenger compartment of said main body, and into forward side peripheries of the passenger compartment of said main body to thereby define a panoramic-type viewing passenger window for passengers positioned in the forward end portion of the main body.

44. An aircraft as defined in claim 43, wherein said raised crew cockpit includes a cockpit window positioned in a forward end of said raised crew cockpit and extending the entire lateral extent of the forward end of said raised crew cockpit and into forward side peripheries of said raised crew cockpit for improving visibility of the portion of the aircraft extending forwardly of said raised crew cockpit.

45. An aircraft as defined in claim 44, wherein forward end portions of said passenger window and said cockpit window extend in generally-parallel horizontal planes.

46. An aircraft as defined in claim 45, wherein each of said passenger and cockpit windows respectively have a generally C-shape extending from a side periphery, across the forward end, and into an opposing side periphery.

* * * * *